Jan. 5, 1965 C. B. LUEBBE 3,164,795

PHOTOELECTRIC STRUCTURES

Filed July 27, 1961

INVENTOR.
CLIFFORD B. LUEBBE,
BY Allen & Allen
ATTORNEYS.

1

3,164,795
PHOTOELECTRIC STRUCTURES

Clifford B. Luebbe, Cincinnati, Ohio, assignor to D. H. Baldwin Company, a corporation of Ohio Filed July 27, 1961, Ser. No. 127,236
7 Claims. (Cl. 338—17)

This invention relates to photoelectric cells of the general type in which electrodes and layers of photosensitive substances are supported by an insulative substrate, and more particularly to structures embodying a plurality of tiny photocells, hereinafter referred to as a "photocell array." Such composite structures are useful in digital encoders, photoelectric organs, and the like.

The substrates employed are normally of the nature of glass or ceramics; and the electrodes are normally of metal.

Great difficulty has been had with the metallic electrodes, primarily because of lack of adhesion to the substrate, fragility, and reactivity with the photosensitive layers, especially where these layers have to be formed or treated at elevated temperatures. Thin metal layers for electrode purposes can be formed on a substrate by vapor deposition; but the difficulties above mentioned are so great that the practice in producing complicated photocell arrays has frequently involved the deposition or forming of a photoelectric layer on the substrate under conditions suitable for such a step, followed by an attempt to deposit the electrodes under other conditions over the photoelectric layer.

It is an object of this invention to provide an electrode structure on a substrate, the combination being one in which the electrode substance cannot be removed from the substrate in any ordinary manipulations.

It is an object of the invention to provide an electrode structure on a substrate, which not only can be formed with great accuracy, but which is not liable to disruption from mechanical causes.

It is an object of the invention to provide an electrode structure made of a material which not only has excellent ohmic contact with the photosensitive coating, but which also has minimal scattering characteristics when deposited through a mask.

It is an object of the invention to provide an electrode structure on a substrate, which electrode structure will not only withstand any conditions subsequently to be encountered in the formation or deposition of a photosensitive coating over the electrode structure itself, but which will also be chemically and physically resistant to the substance of the photosensitive coating, and to any chemical environmental conditions in the formation or treatment of the coating even at high heats.

Process aspects as well as structural aspects are involved in the above objects.

It has hitherto been realized that in most instances a sealed photocell structure is desirable to protect the functioning elements from mechanical damage as well as from external influences such as moisture, oxidation, chemical attack and the like. Hitherto, with small photocell arrays sealing has been attempted by fusing a dished Kovar ring to the periphery of the substrate, fusing a similar ring to a thin piece of cover glass, assembling the parts so that the Kovar rings come together, and soldering or brazing to each other flanges formed on the rings. This method of making a sealed construction is very expensive, and it also has a number of disadvantages. The cover glass is of necessity spaced a considerable distance from the electrodes and photosensitive coating in the array. This results not only in the inclusion of a relatively large quantity of air or other gas, but prevents a close approach of the

2 photocells in the array to the light transmitting elements which are to be scanned or read thereby.

Accordingly it is an object of this invention to provide a sealed photocell or photocell array, and a method of making it, which will be very much cheaper to produce or practice, but which will be devoid of the disadvantages set forth above.

These and other objects of the invention which will be set forth hereinafter or will be apparent to one skilled in the art upon reading these specifications are accomplished in those procedures and in those constructions and arrangements of parts of which certain exemplary embodiments will now be described. Reference is made to the accompanying drawings wherein.

Figures 1, 2, 3, 4, 5, 6:
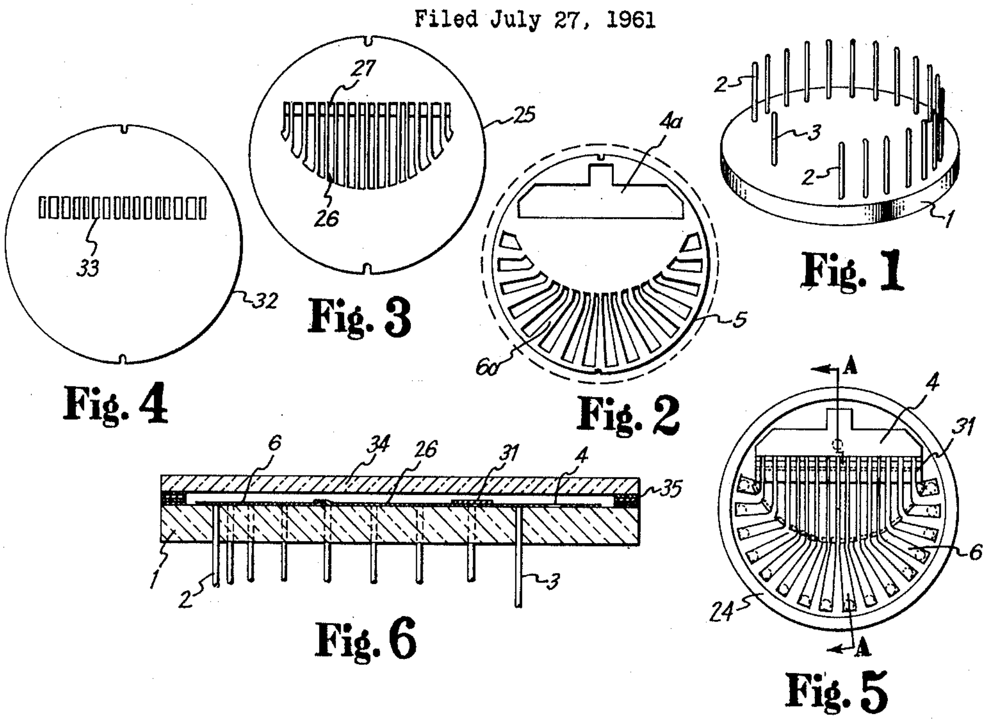
FIG. 1 is a perspective view of the rear side of an exemplary photoelectric array.
FIG. 2 is a plan view of a first mask which may be used in the depositing of electrode portions.
FIG. 3 is a plan view of a second mask which may be used in depositing electrode portions.
FIG. 4 is a plan view of a mask which may be used in depositing a photo-conductive layer.
FIG. 5 is a plan view of the exemplary embodiment of a photocell array.
FIG. 6 is a cross-sectional view taken along the lines A—A of FIG. 5 but showing a cover member on the photocell array and forming a sealed structure.

This invention is based in large part on the discovery that when chromium is vaporized onto a properly prepared glass surface a conductive coating or electrode is formed which unexpectedly has extremely great adhesion to the substrate. Also unexpectedly it has been found that when chromium is deposited through the interstices of a mask onto a glass substrate, there is essentially zero scattering of the chromium onto the glass in the masked areas. Further, it has been found that a chromium coating or electrode is inert to photoelectric coatings of classes hereinafter described, including coatings of metals or metalloids which are deposited thereon by vaporization techniques, and including the formation of compounds of metals or metalloids formed by fusion after deposition. It has been found that chromium may be vaporized onto glass surfaces through masks so as to give deposits of micro-accuracy, and that the effective dimensions of the deposits are not altered or impaired by the formation of the photosensitive coatings thereon. Thus it becomes possible to deposit chromium on glass in pre-selected arrays of great dimensional accuracy, and thereafter to deposit or form coatings of photoelectric substances on the electrodes. The electrodes themselves will not be impaired by any temperature conditions that will not deleteriously affect the substrate.

It is not generally possible to solder or braze conductors or other metallic elements to chromium coatings or electrodes formed on glass as hereinafter taught. However, it has been found possible to deposit on the surfaces of the chromium coatings thin layers of metals or alloys which will have excellent atomic adhesion to the chromium and which will permit soldering or brazing. By careful selection of the metal or alloys, composite coatings may thus be formed which will have all of the adhesion characteristics hereinabove described for chromium, and at the same time will be stable against such temperature and other environmental conditions as will be encountered in the manufacture of photocells as later set forth. Without limitation, an excellent material to be vaporized onto the chromium layers or electrodes is stainless steel, which may be of the type containing around 14 to 20% of chromium with or without nickel, the balance being iron, and which is preferably an iron alloy of the type containing about 18% of chromium and about 8% of nickel. An ideal treatment is to deposit on the chromium first a layer of elemental nickel and then a layer of elemental iron.

The deposition of a metal permitting soldering or brazing onto the chromium layer, makes possible the provision of sealed structures at very slight expense. As will be described more in detail hereinafter, the substrate and a thin cover glass may both be treated to form upon them marginal rims or other matching areas. The chromium rims or areas are then treated by vaporization with stainless steel or other suitable metals or alloys; and when the substrate and the glass cover are placed together with their rims or matching areas in contact they may then be soldered or brazed together to provide a covered or sealed structure in a very inexpensive fashion.

For the formation of the electrodes of this invention, elemental chromium is preferred. However, it has been found that the advantages of the invention can be obtained in useful degrees with alloys in which chromium is the majority component, i.e. constitutes more than 50% by weight of the entire alloy. So far as is known, the advantages of this invention cannot be obtained with any other material for vaporization against the substrate than chromium and its alloys as just set forth; and hereinafter the term "chromium" without other qualification should be understood to refer to elemental chromium and to alloys of which chromium is the majority component.

Glass has been referred to as the substrate. The exact mechanism of the extraordinary adhesion of chromium to glass is not fully understood; but the peculiar adhesion of the chromium to the glass is effective with any kinds of glass which have been tried, including ordinary window glass. However, since the manufacture of many types of photoelectric cells will involve relatively high heats, it is preferred to use a borosilicate glass of the Pyrex family. A borosilicate glass made and sold under the designation Corning 7052 will be found entirely suitable for the purposes of the invention.

The nature of the photoelectric coating is not a limitation on the invention. The improved substrate and electrode structures taught herein may be employed in the formation of lead sulfide photocells where a photosensitive coating may be deposited from a water solution. The invention is especially valuable in connection with those photosensitive coatings which are formed in the dry state from a cationic material such as cadmium, lead, indium, mercury, gallium, zinc, aluminum, arsenic and antimony, and an anionic material such as sulfur, selenium, tellurium, antimony and arsenic, it being understood that the semi-conductive film or photosensitive layer will generally be a stoichiometric compound of relatively cationic and anionic materials. The compound may be formed by reaction in the vapor phase and then deposited on the electrodes and the substrate in vaporized condition. In accordance with the teachings of the Hugle et al. Patent 2,994,621, which was issued August 1, 1961, on application Serial No. 574,804, filed March 29, 1956, a preferred procedure is to deposit alternate layers of the cationic and anionic materials on the substrate and electrodes, and thereafter treat the deposits with heat (usually in an oxidizing atmosphere) to the extent that the desired reaction takes place and any excess of the substance having the higher vapor pressure is evaporated away, leaving a layer in which the materials exist in stoichiometric proportions. A very excellent semi-conductive or photoelectric film of cadmium selenide can be formed on the substrate and electrodes by the procedure just mentioned. It will be understood by the skilled worker in the art that the response of different semi-conductive films to radiation will vary in accordance with the nature of the film, so that various films may be chosen by the worker in accordance with their known characteristics.

In the formation of chromium electrode structures, two procedures may be followed. The chromium may be deposited by vaporization over the entire surface of the substrate, after which a resist (usually a photo-resist applied in a photographic process) may be caused to cover those portions of the chromium layer which are to remain to form the electrode structure, whereupon the uncovered portions of the chromium can be removed by a suitable etchant. Or, as described in connection with the first embodiment of this invention, the chromium can be vaporized onto the substrate through a mask so as to form the electrode structure directly.

The manufacture of a composite photocell array, such as may be used in a digital encoder, will now be described. This is a tiny photocell array (which may be less than one inch in diameter) but which may contain a relatively large number of individual photocells, say 18 to 20. A substrate in the form of a small disc of borosilicate glass is indicated at 1. The photocells on it will each have a common electrode and an individual electrode. It follows from this that a comparatively large number of electrical connections will have to be made to the electrodes. It has hitherto been suggested that these connections be made through leads extending through the substrate and fused thereto. In FIG. 1 a plurality of rods 2 for the separate electrodes and a rod 3 for the common electrode have been shown as extending through the substrate 1 and projecting from one side of it. The rods or wires may be made of Kovar, which is a well known alloy of nickel, cobalt, manganese and iron. The alloy has substantially the same coefficient of expansion as borosilicate glass and therefore can be sealed to the glass under heat.

The rods or wires extend through the body of the substrate and project from the rear side of it as shown so that electrical connectors may be soldered to the rods or wires. On the front or face side of the substrate the ends of the rods are exposed, but the rods preferably do not extend above the surfaces of the substrate. Such a structure may be made by placing suitable Kovar rods or wires in a jig, bringing a small disc of the borosilicate glass into contact with the top ends of the rods and then softening the glass by heat until the rods penetrate it and are sealed to it. The upper surface of the substrate should be flat and smooth. Any upwardly convex portion of the substrate and any portions of the rods extending above the face of the substrate may be removed by buffing or grinding. So long as the upper ends of the rods are exposed at the face of the substrate, electrode coatings of chromium can be deposited on the substrate in such fashion as to come into electrical contact with the wires or rods. If desired, such electrical contact may be assured by soldering the chromium coatings to the ends of the rods, preferably by the use of an indium-containing solder.

After a suitable treatment of the glass surface, electrodes or electrode portions may be deposited thereon by vaporization. The deposition may be accomplished in several stages as later described. It is essential that the glass surface be carefully prepared and absolutely clean. It is also advantageous to etch the upper surface of the substrate. Various procedures may be followed. Without limitation, a satisfactory procedure is set forth in the following example.

*Example I—Preparation of the Substrate*

The upper surface of the substrate is preferably buffed on a buffing wheel of canvas using a mild abrasive compound. The treated surface is then scrubbed with benzene and a brush, after which it is wiped with a clean towel. Next, the surface is treated for about 90 seconds with a 2% solution of hydrofluoric acid. It will be understood that the substrate elements, being small, may be handled in groups by means of any suitable tray-like element with holes or depressions to receive the structures.

At the end of the treatment with hydrofluoric acid, the substrate elements are rinsed in water to arrest the etching. The steps thus far outlined may be repeated if desired one or more times. In particular, additional buffing treatments followed by cleansing in benzene may be found desirable, whether or not these include additional etching treatments.

The structures are next preferably boiled in 20% hydrochloric acid solution for about 1½ minutes, rinsed and then boiled in distilled water for a length of time of about 7 minutes, being thereafter rinsed in distilled water and then in alcohol.

A final etch in 2% hydrofluoric acid for 20 to 22 seconds followed by rinsing, boiling in distilled water and again rinsing in distilled water and alcohol successively, will be found to achieve both the desired cleanliness and the desired etched condition. The alcohol employed may be either methyl or ethyl alcohol, but should be so nearly anhydrous that a simple exposure of the article to air will give a clean, dry surface.

While it will be understood that this invention is not limited to specific arrangements of electrodes on the substrate, where a large number of photocells of very minute size is to be produced on a substrate of minimal dimensions, it will usually be found effective and convenient to provide a plurality of masks and to deposit different portions of the electrodes in sequence. This is because a single mask configured with openings to provide all parts of all electrodes would be complicated and somewhat expensive to produce, and may be found to be fragile.

In the particular embodiment of a photocell array for use in a digital encoder, as best seen in FIG. 5, there will be a common electrode 4 from which various branches appear to extend in a sunburst formation, each of these last mentioned electrodes having enlarged upper ends in contact with respective ones of the separate electrode connector members 2. Between the enlarged upper ends of these separate electrode members, there are substantially parallel deposit portions extending downwardly toward the common electrode as clearly illustrated in the figure.

The masks themselves may be made of different materials which will lend themselves to mask making, and particularly to the formation of orifices by etching. One of these materials, but without limitation, is beryllium-copper in thin sheet form, say about .002″ thick. Masks may be made of this material, and will be found to be durable in repeated use.

The mask openings, which must be very accurate, are preferably formed by imposing on the metal sheet surface a photo-resist by a photographic process, leaving uncovered the areas which are to be removed to form the openings. The actual openings are then produced by subjecting the metal sheet to a suitable etchant solution.

The deposition of the electrodes in a series of successive operations through different masks is not difficult providing that the openings in the several masks which are to coact to form electrode structures having electrical continuity are configured to overlap.

The following is an example of a procedure and apparatus which may be used to form the electrodes.

*Example II—Masking and Electrode Deposition*

In FIG. 2 there is illustrated at 5 an exemplary first mask. This is a disc of beryllium-copper having an opening *4a* therein through which the common electrode 4 may be formed. It also has other openings *6a* through which the upper enlarged ends of the separate electrodes 6 (FIG. 5) may be deposited. The mask preferably has locating holes or notches *5a* for a purpose hereinafter set forth.

Figure 7:
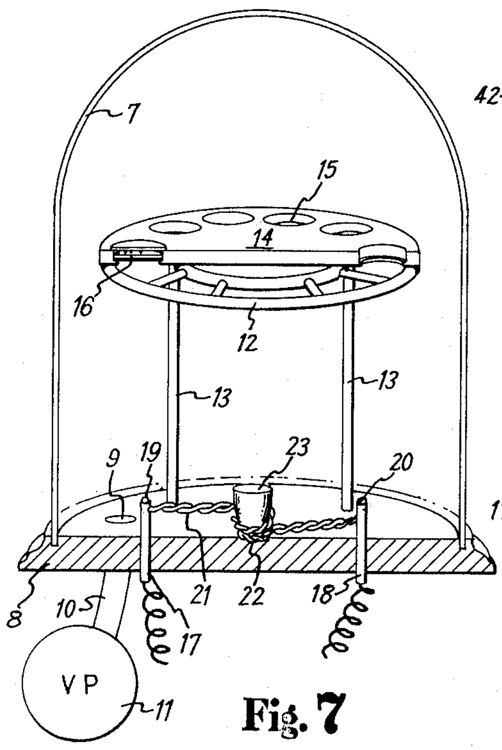
FIG. 7 is a diagrammatic cross-sectional view of an apparatus which may be employed for electrode deposition.

In FIG. 7 there is a diagrammatic illustration of a vaporization apparatus which may be used in the practice of this invention. The skilled worker in the art will understand that other designs of apparatus can be employed. The drawing shows a bell jar or glass member 7 which coacts with a base 8 in such a way that the interior of the bell jar may be highly evacuated. For this purpose an opening 9 is shown in the base, the opening being connected by a conduit 10 to a vacuum pump 11.

Within the bell jar there is an elevated supporting means 12 held away from the base by legs 13. A platform member 14 of suitable substance rests on the supporting means, and has holes or depressions in it to accept a plurality of the substrate elements (here indicated at 16) in such a way that their top surfaces will be exposed downwardly.

There are various ways in which this may be done. One way is to provide holes in the platform 14, which holes present at their bottoms a slight inwardly projecting lip. A mask may be placed on this lip, with the substrate element resting on the mask. To locate the mask accurately with respect to the substrate, use is made of the notches *5a* in the mask; and the substrate may have similar notches in its periphery, the hole in the platform having ridges in its inner surface to engage the notches in the mask and the substrate and keep these elements in alignment and properly indexed with respect to each other. A plate or other weight element may be placed on the platform above the substrate element to hold it down on the mask.

On the base 8 there will be one or more pairs of binding posts 17 and 18. These are maintained in electrical insulation from each other; and provision is made below the base 8 for connecting the binding posts with a source of electrical current. The binding posts carry clamps 19 and 20 which can be caused to engage the ends of a means for holding, heating and vaporizing a material. A means suitable for use with chromium, nickel, iron or other metals requiring high heats comprises a wire element 21 which may be made of tungsten or other highly refractory metal. The ends of the wire element are engaged with the binding posts 19 and 20, while a central portion of the wire is configured to form a sort of basket 22. A pellet of chromium may be placed directly in the basket, or if desired, a small crucible 23 may be inserted into the basket and the chromium, in any suitable comminuted form, may be placed therein.

In the operation of the device, after the masks and substrate elements are in place on the platform 14, and the means for vaporizing the chromium is as above described, the bell jar will be put into place on the base, and the chamber thus formed will be highly evacuated. Although different degrees of evacuation may be employed, a vacuum of .01 micron of mercury may be considered representative.

The binding posts 17 and 18 are next energized; and the effect of the electrical current will be to heat the wire element 21 to a high temperature, i.e. a temperature high enough to vaporize the chromium in the basket or crucible. The chromium vapors pass upwardly and condense on the substrate through the openings in the mask. The amount of chromium deposited may be controlled by varying the time of the treatment, but may also be controlled by varying the amount of chromium introduced into the basket. The thickness of the chromium layers on the glass of the substrate elements can be varied as desired; but it has been found that a thickness to give a resistivity of about 10 to 25 ohms per square will generally be satisfactory.

The result of the vapor deposition thus far described will be the production of a common electrode *4b*, and the separate electrode upper end portions 6 in the chromium on the glass surface.

The vacuum in the chamber may now be released, the bell jar removed, and second mask elements 25 substituted on the substrate elements 16. A second mask element is illustrated in FIG. 3. It consists of a beryllium-copper disc with openings in it corresponding to the thin parallel intermediate portions 26, the openings being so configured that the chromium deposited through them will slightly overlap the electrode upper end portions 6 and the common electrode *4b*.

It will be understood that there must be an interruption in the continuity of each of the parallel intermediate portions 26 of the electrodes, which interruption or gap will be bridged by the semi-conductive or photosensitive layer, if complete, operative photoelectric cells are to be formed in the array. While under certain circumstances this interruption could be formed by scribing, this is difficult to do with electrodes having the remarkable adherence of those set forth herein. However, it has been found possible to form the interruptions by masking; and in FIG. 3 there is shown a very fine transverse element 27 traversing the openings in the mask 25. In the exemplary embodiment, this element is 1 mil in thickness and, in the mode of making the masks outlined above this transverse element may be formed in the etching procedure. The mask is capable of forming very accurately dimensioned parallel intermediate electrode portions, each with a 1 mil interruption in it, so that each photocell of the array has two separate electrodes, with the gap between them bridged by the subsequently applied semi-conductive layer.

With the second masks in place on the various substrate elements, the same or a different wire element 21 containing chromium pellets may be engaged between the binding posts 17 and 18. The bell jar 7 is then replaced on the base 8 and the chamber evacuated as before. After evacuation the application of electric current to the binding posts will vaporize the chromium and form on the substrate elements the additional electrode parts in the manner already described.

As has been indicated, it is desirable for sealing purposes to form on the substrate a marginal coating 24 of chromium by vapor deposition. In vaporizing chromium and like metals by a procedure such as has been described, the vaporized particles proceed in straight lines from the vaporization point. It is obvious that a marginal rim of chromium could be formed on the substrate by using a mask smaller in external diameter than the substrate, so as to leave a marginal portion of the substrate exposed. But such a mask cannot be held against the substrate by clamps or clips attached to the platform, since these would "cast shadows" and result in uncoated portions of the substrate rim. It has been found, however, that such a mask may be held against the substrate surface by a water-vehicle glue. The chromium can then be deposited as will be clear from the above description; and the deposition of the chromium may be followed by the deposition of stainless steel or of successive coatings of nickel and iron while the mask remains in place. The base may be provided with several sets of binding posts and wire elements with baskets so that these operations may be carried on successively without relieving the vacuum.

The marginal rim 24 may be deposited on the substrate either before or after the formation of the electrode structure on the substrate; but in any case it will be deposited prior to the formation of the photosensitive deposit. When the marginal rim 24 has been completed, the substrate and mask may be separated by using water to soften and remove the glue. Of course, the surface of the substrate must be clean and dry prior to the imposition of other vaporized materials on the substrate; but the original surface preparation steps outlined in Example I need not be repeated as such.

The photocell array is now in condition for the application of the photosensitive layer indicated at 31 in FIG. 5. This photosensitive layer may be deposited by the use of yet another mask illustrated at 32 in FIG. 4. This mask will have a diameter at least equal to the outer diameter of the substrate element 1; and it preferably has a group of openings 33 through which the photoelectric composition or components thereof can be vaporized onto the substrate and selected electrode portions. For the purposes of the exemplary photocell array, separated areas of photosensitive substance, one for each photocell, are desirable, but in some constructions the use of a layer of photosensitive substance common to all of the electrodes is entirely satisfactory.

Figures 8, 9, 10:
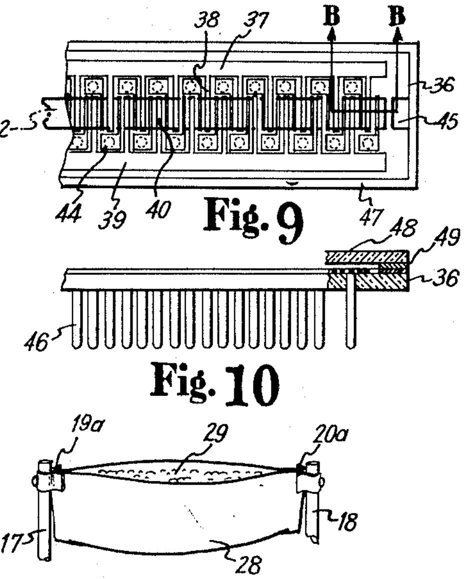
FIG. 8 is a partial perspective view of an alternative form of vaporization means.
FIG. 9 is a partial plan vew of a photocell array of a different type.
FIG. 10 is a side view with parts in section taken along the line B—B of FIG. 9.

A somewhat different vaporization means, illustrated in FIG. 8, may be used in forming the photosensitive layer. Here, the binding posts are provided with clamps *19a* and *20a* to hold the ends of an electrically conductive sheet of refractory metal such as molybdenum, folded over on itself to form a boat 28. The material to be vaporized will be placed in the boat as at 29.

As has been indicated, the photosensitive layer may be deposited in various ways. A composition such as cadmium selenide, for example, may be preformed as such and then vaporized onto the substrate and electrodes. Again, in forming such a coating after the manner taught in the Hugle et al. patent referred to above, alternating layers of cadmium and selenium may be deposited on the substrate and electrodes, the multiple deposits thereafter being heat treated to produce the reaction and vaporize off any excess of selenium over the stoichiometric proportions.

It is within the spirit of the invention to provide in connection with the base 8 a plurality of sets of binding posts and vaporization boats, the various sets being arranged for simultaneous or sequential electrical energization, using apparatus otherwise like that shown in FIG. 7.

The heating step referred to above may be carried on in a muffle type furnace of conventional character, and is usually done in the presence of an air atmosphere.

The principles of the invention are applicable to the use also of photosensitive layers which may be deposited otherwise than by vaporization, e.g. from a solution.

FIG. 5 illustrates an exemplary final arrangement of substrate, electrodes, photosensitive coating and marginal sealing rim. The sealing rim 24 having been treated with stainless steel or other substance to permit soldering or brazing, may next be tinned, if desired.

The sealed photocell array structure is illustrated in cross-section in FIG. 6. Here use is made of a thin cover glass member 34 which has had vaporized onto it a marginal rim portion a coating of chromium followed by a coating or solderable metal or metals. These coatings are illustrated at 35 in the figure. After the deposition of the solderable layers, the exposed surface of the marginal rim on the cover glass 34 may be tinned.

The parts are assembled as shown in FIG. 6; and is now possible either to fuse the tinned surfaces of the marginal rims of the substrate and cover glass together by the application of heat, or to solder them together by the application of molten solder, using the ordinary techniques of the soldering art.

A different form of photoelectric cell array is illustrated in FIGS. 9 and 10. It has hitherto been proposed to provide a photocell array for use in photoelectric organs in which each individual photocell has three electrodes. A central one of these electrodes is used for polarizing purposes, and the two outer electrodes of each cell may be connected up to an output system through a center tap transformer in such a way as to cancel the direct current component of the signal. Such an arrangement and circuit is taught in the copending application of Jones et al., Serial No. 430,570, filed August 25, 1955, now Patent No. 3,023,657, and entitled Photoelectric Musical Instruments and the Like. A typical electrode arrangement for a photocell array of this type is illustrated in FIG. 9. Here on a substrate 36 a series of electrodes are formed comprising a first common electrode member 37 having a plurality of electrode branches 38 like the teeth of a comb, a second common electrode structure 39 having a plurality of electrode branches 40, again like the teeth of a comb. These electrode elements are in opposed relationship, with the electrode branches 38 and 40 in spaced relationship. The third electrodes 41 are located between respective spaced electrode branches of the common electrode members 37 and 39.

The photoelectric coating is a long stripe of photosensitive substance indicated at 42 and lying wholly inwardly of the ends of the several interdigitating electrode members.

There is a problem of making electrical connections to the third electrodes of each photocell. In one way of solving this problem, the ends of the third electrodes are provided with enlarged contact areas 43 and 44. Individual wires may be soldered to these enlarged contact areas, or electrical connection may be effected through clips. It is desirable to cover the coating 42 of photosensitive substance with a protective cover glass, and this may be done by providing at each end of the array on an area 45 of chromium covered by a solderable metal or metals, and by providing a narrow cover glass, only slightly wider than the stripe 42 of photosensitive material, forming on the ends of this cover glass similar areas of chromium and solderable metal, and then soldering the cover glass in place as has been described in connection with FIG. 6. This alone would not provide a sealed construction, but it would permit making electrical connections with the areas 43 and 44 by wires or clips. Further, a sealing compound can be run down the free edges of the glass strip to seal them against the substrate.

However, by an extension of the techniques hereinabove described, an entirely sealed construction may be made for the photocell array of FIGS. 9 and 10. Pins 46 may be provided for each of the contact areas 43 and 44 and for the common electrode portions 37 and 39. A marginal rim 47 of chromium surfaced with solderable metal may be formed about the edges of the substrate 36 and a similar rim formed about the edges of a thin cover glass 48. These structures may then be soldered or fused together as at FIG. 10 in the manner previously described.

Modifications may be made in the invention without departing from the spirit of it. The invention having been described in certain exemplary embodiments, what is claimed as new and desired to be secured by Letters Patent is:

1. In a photoelectric cell, a glass substrate, an electrode structure of chromium vaporized onto said substrate, and a coating of photosensitive substance on said electrode structure, said glass substrate being a borosilicate glass, the coating of photosensitive substance consisting essentially of a compound formed from a cationic material chosen from a group consisting of cadmium, lead, indium, mercury, gallium, zinc, aluminum, arsenic and antimony, and an anionic material chosen from a class consisting of sulfur, selenium, tellurium, antimony and arsenic, said coating of photosensitive substance being vaporized onto said electrode structure, there being metallic contact pins extending through said substrate and making electrical contact with selected portions of said electrode structure and providing means on the side of said glass substrate opposite said electrode structure for connection to electrical structures, said substrate having a coating of chromium in a marginal portion, said coating bearing a layer of metallic substance which is solderable, said photoelectric cell including a cover glass member similarly bearing a coating of chromium and a solderable substance in a marginal portion, the said marginal portions being juxtaposed and soldered together, the said solderable substance being stainless steel vaporized onto said chromium coating.

2. In a photoelectric cell, a glass substrate, an electrode structure of chromium vaporized onto said substrate, and a coating of photosensitive substance on said electrode structure, said glass substrate being a borosilicate glass, the coating of photosensitive substance consisting essentially of a compound formed from a cationic material chosen from a group consisting of cadmium, lead, indium, mercury, gallium, zinc, aluminum, arsenic and antimony, and an anionic material chosen from a class consisting of sulfur, selenium, tellurium, antimony and arsenic, said coating of photosensitive substance being vaporized onto said electrode structure, there being metallic contact pins extending through said substrate and making electrical contact with selected portions of said electrode structure and providing means on the side of said glass substrate opposite said electrode structure for connection to electrical structures, said substrate having a coating of chromium in a marginal portion, said coating bearing a layer of metallic substance which is solderable, said photosensitive cell including a cover glass member bearing a coating of chromium and a solderable substance in a marginal portion, the said marginal portions being juxtaposed and soldered together, said solderable substance being stainless steel vaporized onto said chromium coating.

3. The structure claimed in claim 2 wherein said marginal portions extend entirely around said substrate and said cover glass and are soldered together throughout their length, whereby to provide a wholly sealed structure.

4. In a sealed electrical structure, a pair of glass members, each of which has a vapor-deposited marginal rim of chromium thereon, surmounted by at least one layer of solderable metal, the said glass members being in superposed relationship with their said marginal rims in contact and soldered together, electrical elements enclosed between said glass members, and contact means for said electrical elements extending through and sealed to at least one of said glass members.

5. In a process of making a photoelectric structure, the steps of imposing on a glass substrate an electrode structure of chromium by vaporization, imposing on said electrode structure a coating of photosensitive substance, providing on said substrate at least one additional area of chromium deposition, providing on a cover glass an area of chromium deposition corresponding to said additional area on said substrate, depositing a layer of solderable metal on the chromium in said additional areas, bringing said substrate and said cover glass into superposition with said additional areas in contact, and soldering the metallic deposits in said additional areas to each other.

6. The process claimed in claim 5 wherein said additional areas are continuous marginal rim portions of said substrate and said cover glass.

7. The process claimed in claim 5 wherein said electrode structure is formed by depositing chromium through at least one mask onto said substrate.

References Cited in the file of this patent

UNITED STATES PATENTS

| | | |
|---|---|---|
| 2,423,476 | Billings et al. | July 8, 1947 |
| 2,852,648 | Duffield | Sept. 16, 1958 |
| 2,951,224 | Magrath | Aug. 30, 1960 |
| 2,994,621 | Hugle et al. | Aug. 21, 1961 |
| 3,023,657 | Jones et al. | May 6, 1962 |
| 3,076,959 | Pong | Feb. 5, 1963 |